No. 788,228. PATENTED APR. 25, 1905.
W. S. THOMSON.
SCREW DRIVER OR KINDRED TOOL.
APPLICATION FILED APR. 9, 1904.
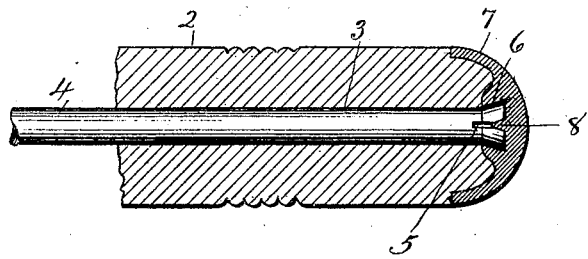

No. 788,228. Patented April 25, 1905.

UNITED STATES PATENT OFFICE.

WILLIAM S. THOMSON, OF PLANTSVILLE, CONNECTICUT.

SCREW-DRIVER OR KINDRED TOOL.

SPECIFICATION forming part of Letters Patent No. 788,228, dated April 25, 1905.

Application filed April 9, 1904. Serial No. 202,422.

*To all whom it may concern:*

Be it known that I, WILLIAM S. THOMSON, of Plantsville, in the county of Hartford and State of Connecticut, have invented a new and useful Improvement in Screw-Drivers or Kindred Tools; and I do hereby declare the following, when taken in connection with the accompanying drawings and the numerals of reference marked thereon, to be a full, clear, and exact description of the same, and which said drawings constitute part of this specification, and represent, in—

Figure 1, a side view of a tool constructed in accordance with my invention; Fig. 2, a longitudinal sectional view through the outer end of the handle enlarged; Fig. 3, a side view of the slotted end of the shank.

This invention relates to an improvement in screw-drivers and kindred tools, and particularly to that class in which the shank extends longitudinally through the handle and provided at its outer end with a head. As usually constructed it is necessary to pass the shank through the handle from the outer end in order that the head may be seated at the outer end of the handle.

The object of this invention is to so form the shank that it may be passed through the handle from the ferrule end and be united with the head, although, if desired, the head and shank may be connected before the shank is inserted into the handle; and the invention consists in the construction as hereinafter described and particularly recited in the claims.

In carrying out my invention I employ a handle 2, which may be of any approved design and formed with a longitudinal hole 3. The tool 4, which may be a screw-driver, chisel, gouge, or other implement, is formed at its upper end with a transverse slot 5. This shank is adapted to pass through the hole 3, with which it corresponds in diameter, and be entered into the recess 6, formed in the center of a cap or head 7, of concavo-convex general form, which is adapted to fit over the outer end of the handle, with which it corresponds in form. As shown, the central portion of the cap is thickened, and a recess which is of smaller diameter than the internal diameter of the cap is formed in this thickened portion. The inner walls of the recess 6 are undercut, and in the center of the recess is a wedge 8, adapted when the shank is forced into the recess to enter the slot 5 and deflect the ends of the shank beneath the undercut walls of the recess and so as to interlock the end of the shank with the cap or head by the formation in this way of two retaining-fingers. By forming the cap and shank independent of each other I am enabled to give the tool its required form before applying the handle, which cannot be done when the shank is formed with the integral head or cap, although, as before stated, the cap and shank may be united before being assembled with the handle; but in this case it necessitates that the shank be passed through the handle from its outer end. By forming the cap or head independent of the shank I am enabled to reduce the cost of manufacture, as the cap can be more readily formed separately than when permanently united with the shank. When the ends of the shank are deflected into the recess, the shank and cap become substantially integral.

Having fully described my invention, what I claim as new, and desire to secure by Letters Patent, is—

In a tool, such as a screw-driver or kindred tool, the combination with a handle having a central longitudinal hole or passage, of a shank passing through the said passage and having its outer end formed with a transverse slot to permit it to be spread to form two retaining-fingers; and a cap concavo-convex in general form and having an inwardly-projecting centrally-arranged boss formed with an undercut concentric chamber containing a centrally-arranged wedge, whereby when the cap and shank are forced together the outer end of the shank enters the said chamber in the cap and meets the said wedge which enters the said slot and spreads the shank to form two retaining-fingers which bind the shank and cap together.

In testimony whereof I have signed this specification in the presence of two subscribing witnesses.

WILLIAM S. THOMSON.

Witnesses:
 ERNEST D. PRINDLE,
 CLEMENT EUSTIS, Jr.